Aug. 8, 1967 J. E. ELPERS 3,335,325
VOLTAGE SENSITIVE CONTROL DEVICE
Filed Sept. 28, 1964
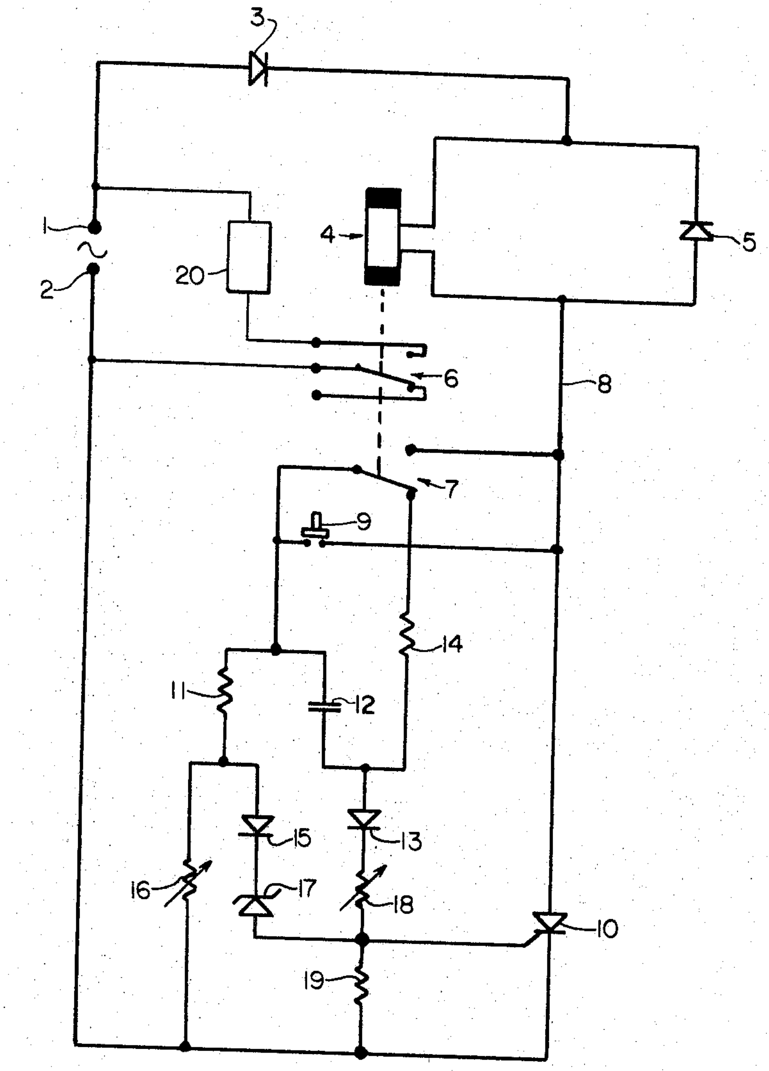
INVENTOR
JEROME E. ELPERS
BY Stewart F. Moore
ATTORNEY United States Patent Office 3,335,325

Patented Aug. 8, 1967

3,335,325
VOLTAGE SENSITIVE CONTROL DEVICE

Jerome E. Elpers, Evansville, Ind., assignor to American Machine & Foundry Company, a corporation of New Jersey Filed Sept. 28, 1964, Ser. No. 399,435
8 Claims. (Cl. 317—31)

ABSTRACT OF THE DISCLOSURE

A solid state control circuit for an electromagnetic relay, which provides under voltage protection for electrical circuits and also incorporates a time delay feature which provides an interval during which conditions on the overall electrical system may stabilize before the under-voltage sensing action begins.

This invention relates to voltage sensing apparatus, and more specifically to an undervoltage sensing device, the operation of which is delayed for a predetermined period.

In any apparatus which requires a minimum voltage level for proper operation and which can operate improperly or be damaged if supplied with less than that minimum, it is desirable to provide a device which can sense the minimum level and can deactivate or otherwise protect the system. In such a circumstance, it is common practice to insert an undervoltage relay across the voltage supply line to sense the unwanted condition, the contacts of the relay being connected to de-energize the load completely, or to give some indication to an operator that the undervoltage condition exists. Circuits of this nature often include Zener diodes as the voltage sensitive devices, and also often include other semiconductive and passive elements.

A disadvantage common to such devices relates to the initial instability of the load with which such a circuit may be used. If the characteristics of the load are such that the load current level is relatively high during the first few cycles, it is likely that the voltage during those few cycles may be low, a situation common to many motor circuits. If the system is provided with an undervoltage relay circuit of conventional design, the low initial voltage may activate the relay circuit, causing the system to be de-energized or causing a false fault signal to be given.

One solution to this problem is to provide a well-regulated power supply unit capable of maintaining substantially constant voltage over the entire range of load currents to be reasonably encountered, thereby eliminating the cause of the problem. This solution is a satisfactory one, but leads to overdesign, high cost, and excessive weight and space requirements. A simpler, more reliable, less expensive and less cumbersome solution is provided by the present invention.

It is therefore an object of the present invention to provide an undervoltage sensing relay circuit which ignores undervoltage conditions during the first few cycles of operation while the system is stabilizing.

A further object is to provide an undervoltage sensing relay circuit which is simple, reliable, and inexpensive.

The present invention utilizes a semiconductor switching device, such as a transistor, a unijunction transistor, a silicon controlled switch, a gate turn-off switch, or the like, as the primary control element controlling the current to energize a relay. Contacts of the relay may be connected in any convenient manner to de-energize the load or signal the undervoltage condition. A Zener diode is provided in the control electrode circuit of the switching element to act as the primary voltage sensing device, the switching element being conductive whenever the voltage supplied is sufficiently high. A capacitor circuit is provided in parallel with the Zener diode portion of the circuit, the charging circuit of the capacitor being operative during the first few cycles of operation to circumvent the sensing action of the Zener diode and to maintain the switching element in its conductive state until the load voltage has had an opportunity to stabilize. Thereafter, the capacitor circuit becomes fully charged, and the circuit is controlled by the Zener diode.

In order that the manner in which the foregoing and other objects are attained in accordance with the invention can be understood in detail, a particularly advantageous embodiment thereof will be described with reference to the accompanying drawing, which forms a part of this specification and wherein the single figure is a schematic diagram of a circuit embodying the invention.

Referring now to the drawings, it will be seen that a terminal 1 and a terminal 2 are provided for connection to an external source of AC voltage, not shown. Terminal 1 is connected to the anode of a conventional semiconductor diode 3, the cathode of which is connected to one terminal of the energizing winding of an electromagnetic relay indicated generally at 4, and also to the cathode of a semiconductor diode 5. Relay 4 can be provided with any convenient number or combination of contact sets, but is shown in the present embodiment as being provided with a single pole double throw contact set indicated generally at 6 and a single pole double throw contact set indicated generally at 7. Following conventional nomenclature, each of the SPDT contact sets 6 and 7 will be referred to as having a movable contact, a normally open contact, and a normally closed contact.

The anode of diode 5 is connected to the other terminal of the winding of relay 4, and also via a conductor 8 to the normally open contact of contact set 7 of relay 4; to one terminal of a normally open push button switch 9; and to the anode of a silicon controlled rectifier 10. The movable contact of contact set 7 of relay 4 is connected to the other terminal of push button switch 9 and also to one terminal of a resistor 11 and one terminal of a capacitor 12. The other terminal of capacitor 12 is connected to the anode of a conventional semiconductor diode 13, and via a resistor 14, to the normally closed contact of relay contact set 7. The other terminal of resistor 11 is connected to the anode of a conventional semiconductor diode 15 and to one terminal of a variable resistor 16, the other terminal of which is connected to AC supply terminal 2. The cathode of diode 15 is connected to the cathode of a Zener diode 17, the anode of which is connected to the gate electrode of silicon controlled rectifier (SCR) 10, and also to one terminal of a variable resistor 18 and a resistor 19. The other terminal of variable resistor 18 is connected to the cathode of diode 13, and the other terminal of resistor 19 is connected to AC supply terminal 2, and also to the cathode of SCR 10.

A load device 20 is shown connected between AC supply terminal 1 and the normally open contact of contact set 6, AC supply terminal 2 being connected to the movable contact of contact set 6. The normally closed contact of contact set 6 is shown with no connection, although it will be clear to one skilled in the are that the load 20 could be connected with a second relay or other controlled device to contact set 6 in any of a variety of ways.

In operation, alternating current is supplied between terminals 1 and 2, providing voltage to one side of the load device 20 and, via diode 3, to relay 4 and SCR 10. SCR 10 is, however, in its nonconductive state, no voltage being provided at the control gate. No current therefore flows through relay 4, and contact set 6 remains in the position shown in the drawing, thereby preventing any current flow through load device 20. To initiate operation of the circuit, push button switch 9 is momentarily depressed, completing a circuit from supply terminal 1 through diode 3, the winding of relay 4, via conductor 8, through switch 9, through the movable and normally closed contacts of contact set 7, through resistor 14, and through diode 13 and resistors 18 and 19 to the other AC supply terminal 2. As soon as current begins to flow through the circuit described, a voltage is developed across resistor 19. The value of resistor 19 and the other resistors in the circuit are selected so that the voltage developed will be sufficient to place SCR 10 in its conductive or low impedance state. When SCR 10 becomes conductive, current flows through the series circuit including diode 3, the winding of relay 4, conductor 8, and the anode and cathode of SCR 10, this current being limited only by the impedances of diode 3 and the winding of relay 4. Relay 4 will then be energized, and contact sets 6 and 7 will be moved to their closed positions, opposite to those shown in the drawing. A circuit will then exist from supply terminal 1 through diode 3 and the winding of relay 4 and through the normally open and movable contacts of contact set 7 to the junction of resistor 11 and capacitor 12.

A complex parallel circuit exists between this junction and the other AC supply terminal 2 but capacitor 12, being in a totally uncharged state when the operation was commenced, will present the lowest impedance and will therefore have the greatest current flow. The primary circuit from the junction of resistor 11 and capacitor 12 will then include capacitor 12, diode 13, and resistors 18 and 19. Once again, current flow through resistor 19 develops a voltage at the gate electrode of SCR 10 sufficient to maintain the SCR in its conductive state and to therefore maintain relay 4 in its energized condition. Thus, a momentary closing of witch 9 is sufficient to energize relay 4 and to maintain it in its energized position.

The high current flow through capacitor 12 will continue for as many cycles as are necessary to bring capacitor 12 to substantially its full charge level, this time being determined by the RC product value of capacitor 12 and the impedances in the series circuit described. These values can be selected to allow capacitor 12 to charge within the first few cycles of the AC supply, the accurate determination of the number of cycles to be determined in accordance with the requirements of load device 20, as discussed more fully below. Thus, it will be seen that the action of the RC timing circuit portion of the present invention is such that relay 4, once energized, will remain energized during the entire timing period regardless of any low voltage transients that may occur during this period.

As capacitor 12 approaches its fully charged condition, current through the ciricuit including resistor 11, diode 15, Zener diode 17, and resistor 19 will increase, as will current flow through resistor 16. When capacitor 12 is fully charged, current flow will be exclusively through resistor 11 and the parallel circuits including resistor 16 and the series circuit of the diodes 15, 17 and resistor 19.

If the voltage supplied to terminals 1 and 2 is sufficiently great, and if the other circuit values are properly chosen, the voltage across Zener diode 17 will be sufficient to cause it to enter its avalanche state and to pass current freely, maintaining sufficient voltage across resistor 19 to keep SCR 10 in its conductive state. However, should the voltage at terminals 1 and 2 fall below a preselected level, this voltage decrease will be detected by Zener diode 17, which will then cease conduction, allowing SCR 10 to return to its high impedance or nonconductive state, thereby de-energizing relay 4.

It will be recognized that the value of voltage at which diode 17 causes the SCR to become nonconductive will be a function of the resistance of resistor 16. Thus, resistor 16 is made variable to be used as a minimum voltage level setting adjustment.

Since the period of time required to charge capacitor 12 to its substantially fully charged level is a function of the impedance in series with capacitor 12 during its charging time, resistor 18 also is made variable to allow an operator to select the interval of time delay.

It will now be clear from the description of operation that the adjustments to be made and the values to be selected are a function of the characteristics of load device 20. If, for example, load device 20 is a motor of a type which requires significantly large currents for the first ten cycles of operation, and if the voltage across the load 20 will therefore normally be somewhat lower during that initial period than is required for operation thereafter, resistor 18 should be set to allow capacitor 12 to charge in a period of time equal to approximately ten cycles. Thus, although the operating voltage during the ten-cycle period will be lower than usual, the Zener diode portion of the control circuit will be prevented from causing deactivation of the system because the charging circuit for capacitor 12 will maintain SCR 10 conductive, and also relay 4 energized.

If a different load is substituted as load device 20, resistor 18 would be adjusted to reflect the particular starting characteristics of that load. Likewise, for a motor or any other device to be placed in the position of load 20, resistor 16 is adjusted to establish the cutoff point at the minimum voltage requirement level of the load.

Zener diode 17 will be conductive, and will maintain SCR 10 in its conductive state, only during the positive half-cycles of the alternating current supply. Diode 5 is therefore inserted in parallel with the winding of relay 4 to prevent de-energization of the relay during the negative half-cycle of the supply. Of course, diode 3 may be replaced by a full-wave or full-wave bridge rectifier, but diode 5 must be retained to prevent relay 4 from de-energizing when the pulsating DC supply falls below the minimum level detected by Zener diode 17.

It will be recognized by one skilled in the art that device 10 need not be a silicon-controlled rectifier, but may be a gate turn-off switch, a silicon-controlled switch, or any device having characteristics similar to those described herein. Likewise, the switching functions accomplished by push button switch 9 and by contact sets 6 and 7 may be modified somewhat without significantly altering the operation of the circuit. It is significant that push button switch 9 need only be depressed momentarily to initiate action of the circuit. Switch 9 may therefore be replaced by a remotely actuated momentary closing relay or other switching device.

While one advantageous embodiment has been chosen to illustrate the invention, it will be understood by one skilled in the art that various changes and modifications can be made therein without departing from the scope of the invention as defined in the appended claims.

What is claimed is:

1. In an undervoltage sensitive relay apparatus, the combination of
- an electromagnetic relay having a coil and at least one single pole double throw contact set,
  - said relay coil having a first and a second terminal;
- semiconductor switching means having a first electrode, a second electrode, and a control electrode,
  - said semiconductor switching means having a conductive state and a nonconductive state and being responsive to a predetermined voltage at said control electrode to go into said conductive state;
- a first circuit portion interconnecting said first electrode of said semiconductor switching means and said first terminal of said relay;

first asymmetrically conductive circuit means interconnecting said first and second terminals of said relay coil;

a pair of terminals to which a source of AC voltage can be connected;

second asymmetrically conductive circuit means interconnecting said second terminal of said relay coil and one of said AC terminals;

a second circuit portion interconnecting said second electrode of said semiconductor switching means and another of said AC terminals;

third asymmetrically conductive circuit means having an avalanche condition;

a third circuit portion interconnecting said first electrode of said semiconductor switching means and the normally open contact of said contact set;

control circuit means interconnecting said control electrode and said second electrode of said semiconductor switching means and the fixed contact of said contact set, said control circuit means being operative when said relay is energized and said third asymmetrically conductive circuit means is in said avalanche condition, to provide a voltage at said control electrode greater than said predetermined value;

capacitive circuit means connected in parallel circuit relationship with a portion of said control circuit means including said third asymmetrically conductive means;

charging circuit means;

resistance means interconnecting said normally closed contact of said contact set and said capacitive circuit means; and switch means interconnecting said fixed and normally open contacts of said contact set for initially energizing said relay.

2. An undervoltage sensitive relay apparatus in accordance with claim 1 and wherein said semiconductor switching means comprises a silicon controlled rectifier.

3. An undervoltage relay circuit comprising a first semiconductor diode;

an electromagnetic relay having a coil, a single pole, double throw contact set, and another contact set;

a semiconductor switching device having at least three electrodes, one said electrode being a control electrode, said semiconductor switching device being responsive to a predetermined value of voltage at said control electrode to go into a low impedance state;

said semiconductor switching device being connected in series circuit relationship with said relay coil and said first semiconductor diode, the normally open contact of said single pole double contact set being connected to the junction of said relay coil and said semiconductor switching device;

a second semiconductor diode connected in parallel circuit relationship with said electromagnetic relay;

a pair of terminals to which a source of AC voltage can be connected, one said terminal being connected to one terminal of said first semiconductor diode, and the other said terminals being connected to one of said electrodes of said semiconductor switching device other than said control electrode;

a first voltage divider circuit connected between a fixed contact of said single pole double throw contact set and one of said AC terminals;

a semiconductor device having an avalanche characteristic;

a second voltage divider circuit including said avalanche semiconductor device connected between an intermediate point of said first voltage divider network and the same one of said AC terminals, said control electrode of said semiconductor switching device being connected to an intermediate point of said second voltage divider circuit;

a capacitor;

a reactive circuit, including said capacitor, connected between said fixed contact of said single pole double throw contact set and said control electrode;

a charging circuit for said capacitor, said charging circuit including a portion of said second voltage divider circuit and said fixed and normally open contacts of said contact set; and a switch operative when actuated to provide an initial energizing circuit for said relay coil.

4. An undervoltage relay circuit in accordance with claim 3 and wherein said second voltage divider circuit comprises the series combination of a semiconductor diode, a Zener diode and a resistance, said control electrode being connected to the junction of said Zener diode and said resistance.

5. An undervoltage relay circuit in accordance with claim 4 and in which said reactive circuit comprises a capacitor, a semiconductor diode and a resistance in series circuit relationship;

said relay circuit further comprising a resistance connected between the normally closed contact of said contact set and the junction of said capacitor and said diode of said reactive circuit; and a normally open switch connected between said fixed and normally open contacts of said contact set;

said last-mentioned resistance and said normally open switch being operative to provide an initial energizing circuit for said relay coil.

6. In an undervoltage sensitive relay control apparatus, the combination of a terminal to which a source of varying DC voltage can be connected;

a point of fixed potential;

an electromagnetic relay having a coil and at least one set of contacts actuated by energizing said coil, said at least one contact set including a normally open contact pair and a normally closed contact pair;

first voltage dividing circuit means connected in series circuit relationship with said relay coil and said normally open pair of contacts of said at least one contact set between said DC supply terminal and said point of fixed potential;

switch means;

first asymmetrically conductive circuit means;

second voltage dividing circuit means including said first asymmetrically conductive circuit means connected in series circuit relationship with said switch means, said relay coil, and said normally closed contact pair between said DC supply terminal and said point of fixed potential;

second asymmetrically conductive circuit means in parallel circuit relationship with said relay coil;

semiconductor switch means having at least three electrodes including a control electrode connected to a first intermediate point of said second voltage dividing circuit means, a first electrode and a second electrode, said semiconductor switch means being characterized by a high impedance state and a low impedance state and being responsive to the application of a predetermined voltage at said control electrode to change from said high to said low impedance state, said semiconductor switch means being connected in series circuit relationship with said relay coil between said DC supply terminal and said point of fixed potential, said semiconductor switch means being operative to allow energizing current to flow to said relay coil when in said low impedance state;

said switch means being operative when momentarily actuated to establish a voltage level at said first intermediate point of said second voltage dividing circuit means sufficient to change said semiconductor switch means from said high to said low impedance state;

capacitor means connected in series circuit relationship with said relay coil, said normally open contact pair and a portion of said second voltage dividing circuit means, said capacitor means being operative to maintain said voltage level at said first intermediate point while said capacitor charges through the circuit including said portion of said second voltage dividing circuit means to keep said semiconductor switch means in said low impedance state;

third asymmetrically conductive circuit means characterized by an avalanche voltage level above which said third asymmetrically conductive circuit means conducts current freely, said last-mentioned means being connected between an intermediate point of said first voltage dividing circuit means and said control electrode, and being operative to maintain said semiconductor switch means in a low impedance state when the voltage supplied to said DC supply terminals remains above a predetermined average value after said capacitor means is substantially fully charged.

7. An apparatus in accordance with claim 6 and wherein said semiconductor switch means comprises a silicon controlled rectifier.

8. An apparatus in accordance with claim 6 and in which said semiconductor switch means comprises a silicon-controlled rectifier.

References Cited

UNITED STATES PATENTS

| | | | |
|---|---|---|---|
| 2,882,456 | 4/1959 | Koch | 317—141 X |
| 3,001,100 | 9/1961 | Schuh et al. | 317—33 X |
| 3,119,951 | 1/1964 | Davy | 317—49 X |
| 3,198,989 | 8/1965 | Mahoney | 317—33 |
| 3,243,658 | 3/1966 | Blackburn | 317—31 |

MILTON O. HIRSHFIELD, *Primary Examiner.*

R. V. LUPO, *Assistant Examiner.*